(12) United States Patent
Yaphe et al.

(10) Patent No.: US 9,140,435 B2
(45) Date of Patent: Sep. 22, 2015

(54) METHOD AND APPARATUS FOR OUTLINING RECESSED INSTALLATION OF A COMPONENT WITHIN A SURFACE MATERIAL

(71) Applicant: Axis Lighting, Inc., Montreal (CA)

(72) Inventors: Howard Yaphe, Saint Laurent (CA); Christianne Leblanc, Montreal (CA); Sebastien Bire, Montreal (CA); Andrew Miles, Cornwall (CA)

(73) Assignee: Axis Lighting Inc., Montreal (CA)

( * ) Notice: Subject to any disclaimer, the term of this patent is extended or adjusted under 35 U.S.C. 154(b) by 345 days.

(21) Appl. No.: 13/763,320

(22) Filed: Feb. 8, 2013

(65) Prior Publication Data
US 2014/0223753 A1 Aug. 14, 2014

(51) Int. Cl.
| | |
|---|---|
| *G01B 3/14* | (2006.01) |
| *F21V 21/00* | (2006.01) |
| *E04B 9/00* | (2006.01) |
| *F21V 15/01* | (2006.01) |
| *H02G 1/00* | (2006.01) |
| *F21S 8/02* | (2006.01) |
| *H02G 3/00* | (2006.01) |

(52) U.S. Cl.
CPC ............... *F21V 21/00* (2013.01); *E04B 9/006* (2013.01); *F21S 8/026* (2013.01); *F21V 15/01* (2013.01); *G01B 3/14* (2013.01); *H02G 1/00* (2013.01); *F21S 8/02* (2013.01); *H02G 3/00* (2013.01); *Y10T 29/49895* (2013.01)

(58) Field of Classification Search
CPC ................................. G01B 5/14; E04F 21/00
USPC ............ 33/562, 563, 565, 566, 1 G, 613, 645
See application file for complete search history.

(56) References Cited

U.S. PATENT DOCUMENTS

| | | |
|---|---|---|
| 2,545,119 A | 3/1951 | Stratton et al. |
| 3,919,542 A | 11/1975 | Castic |
| 4,138,716 A | 2/1979 | Muhlethaler et al. |
| 4,410,931 A | 10/1983 | DeCandia et al. |
| 5,119,282 A | 6/1992 | Meyer et al. |
| 5,245,518 A | 9/1993 | Aspenwall |

(Continued)

FOREIGN PATENT DOCUMENTS

WO WO 2012/156859 11/2012

OTHER PUBLICATIONS

Winona Lighting catalog "decorative Full Circle", http://www.hokproductdesign.com/myos/my-uploads/2011/07/21/full-circle-brochure.pdf, Jul. 21, 2011.

*Primary Examiner* — Yaritza Guadalupe-McCall
(74) *Attorney, Agent, or Firm* — Weaver Austin Villeneuve & Sampson LLP

(57) ABSTRACT

Described are various embodiments of a method and apparatus for outlining recessed installation of a component within a surface material. In one embodiment, the apparatus generally comprises two or more template or alignment modules adjacently disposable against the surface material and each comprising opposed edges that can be aligned with adjacently disposed edges so to define a substantially continuous spacing along these adjacently disposed edges. This spacing is generally dimensioned so to accommodate a corresponding component dimension such that, the aligned edges guide removal of surface material along the spacing to accommodate recessed installation of the component within the surface material.

18 Claims, 10 Drawing Sheets

(56) References Cited

U.S. PATENT DOCUMENTS

| | | |
|---|---|---|
| 5,448,460 A | 9/1995 | Belfer et al. |
| 5,452,187 A | 9/1995 | Belfer et al. |
| 5,574,600 A | 11/1996 | Agro |
| 5,583,583 A | 12/1996 | Wilson |
| 5,609,414 A | 3/1997 | Caluori |
| 6,152,573 A | 11/2000 | Mitchell |
| 6,220,317 B1 | 4/2001 | Martin et al. |
| 6,267,491 B1 | 7/2001 | Parrigin |
| 6,421,904 B1 | 7/2002 | Wedekind et al. |
| 6,698,103 B2 * | 3/2004 | Nortier et al. .................. 33/645 |
| 6,702,453 B2 | 3/2004 | Weedon |
| 6,926,477 B2 * | 8/2005 | Allemann et al. ............ 409/130 |
| 7,086,171 B2 * | 8/2006 | Lawson .......................... 33/562 |
| 7,114,826 B1 | 10/2006 | Lilly |
| 7,293,895 B2 | 11/2007 | Grossman et al. |
| 7,363,720 B2 * | 4/2008 | DiGavero et al. ............... 33/528 |
| 7,497,025 B2 * | 3/2009 | Murray .......................... 33/528 |
| 7,611,269 B1 | 11/2009 | Lyons |
| 8,118,455 B2 | 2/2012 | Cowan et al. |
| 2003/0115767 A1 * | 6/2003 | Wedekind et al. ............... 33/566 |
| 2005/0217129 A1 * | 10/2005 | Boys .............................. 33/528 |
| 2006/0098307 A1 | 5/2006 | Campean |
| 2006/0164844 A1 | 7/2006 | To |
| 2012/0287628 A1 | 11/2012 | Markell |
| 2014/0223753 A1 * | 8/2014 | Yaphe et al. .................... 33/566 |
| 2014/0237836 A1 * | 8/2014 | Yaphe et al. .................... 33/528 |

* cited by examiner

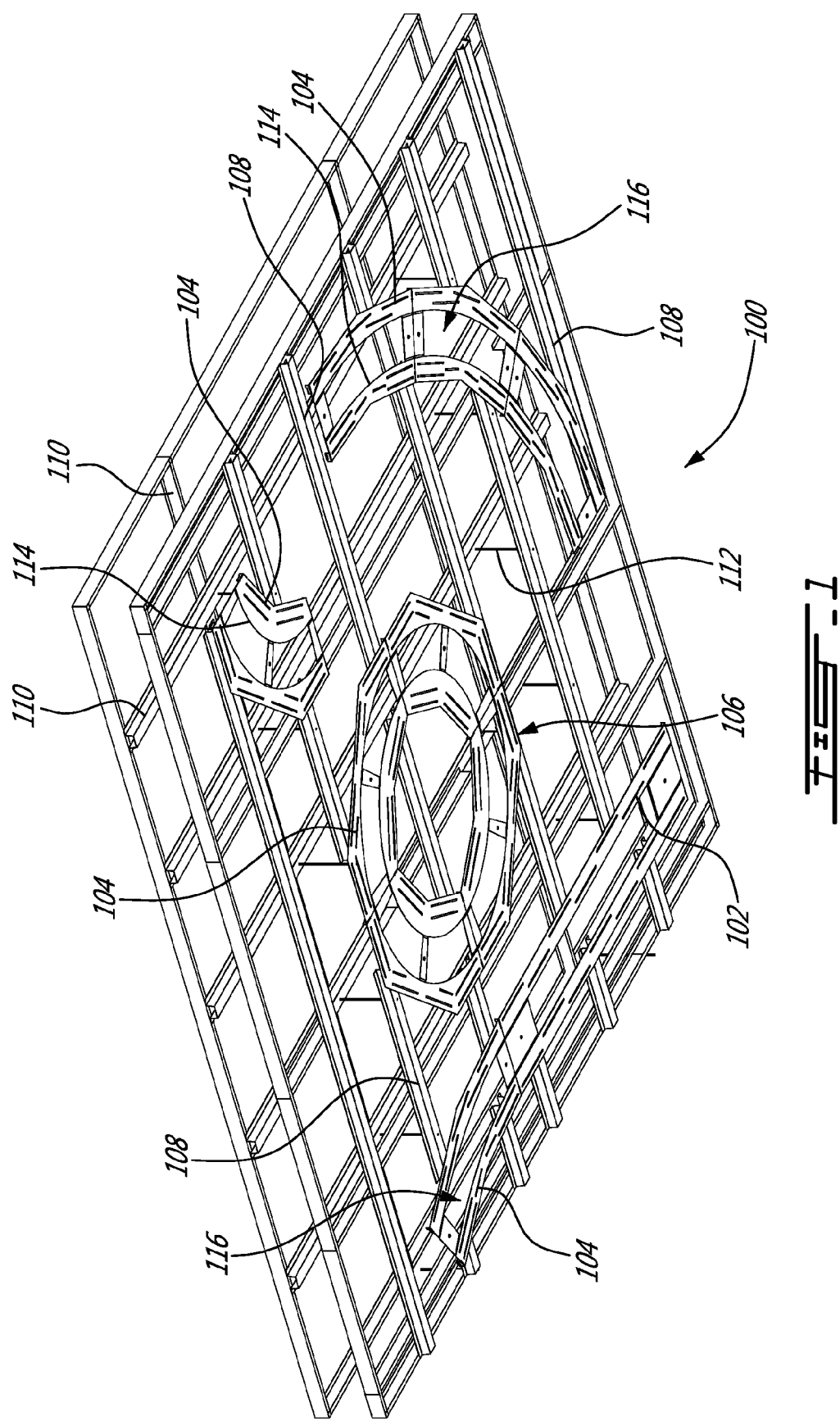

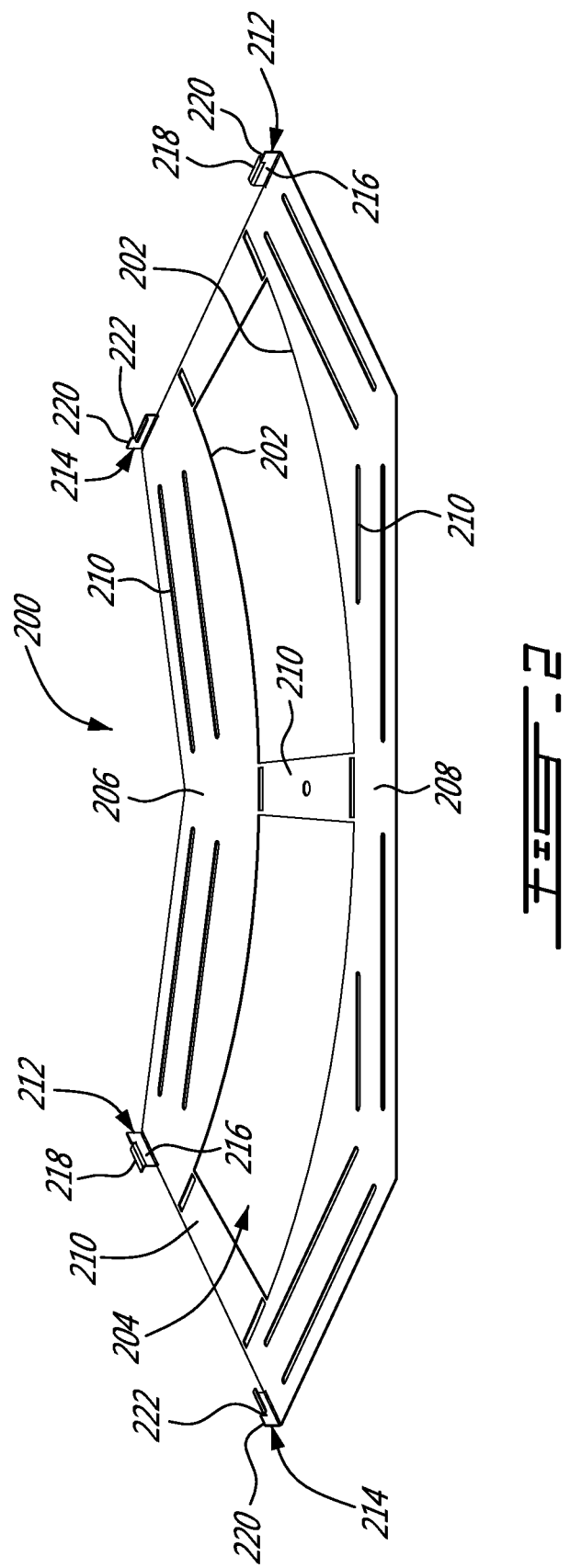

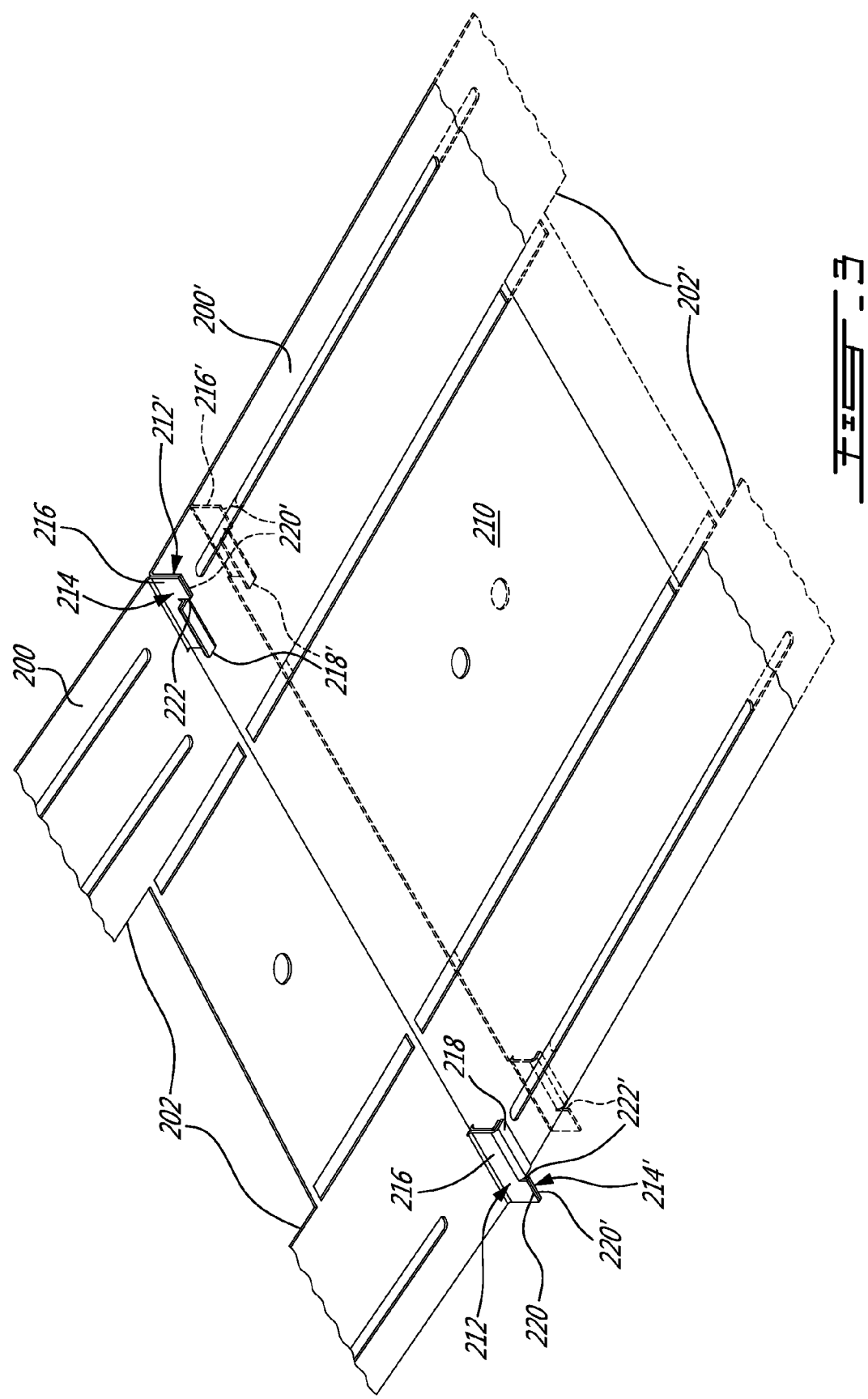

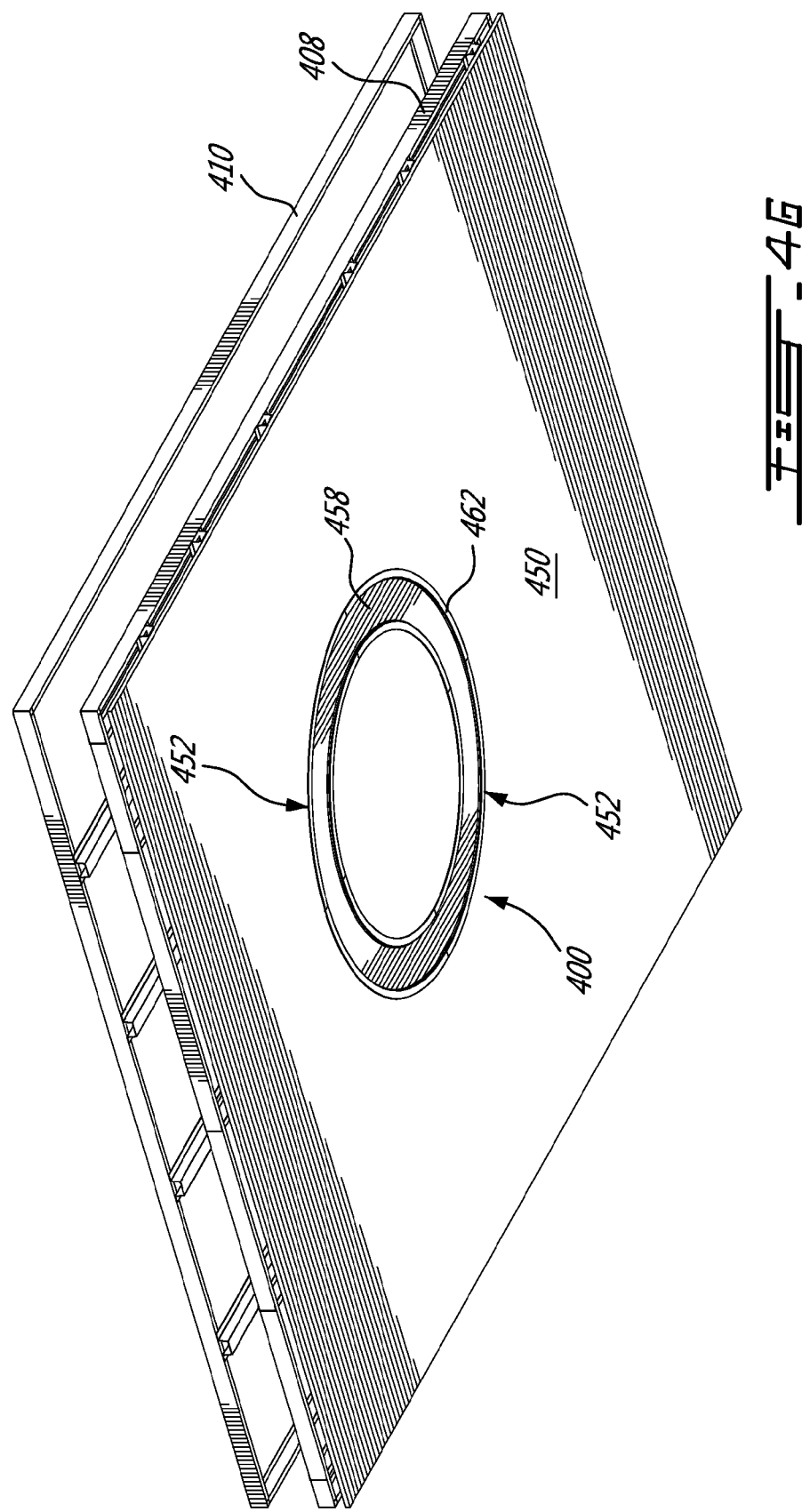

METHOD AND APPARATUS FOR OUTLINING RECESSED INSTALLATION OF A COMPONENT WITHIN A SURFACE MATERIAL

FIELD OF THE DISCLOSURE

The present disclosure relates to recessed installation methods, and in particular, to a method and apparatus for outlining recessed installation of a component within a surface material.

BACKGROUND

Recessed installation of a component within a surface material generally entails the formation of an aperture within the surface material dimensioned so to receive the component therethrough for installation. In some applications, a guide or template may be provided to guide formation of such apertures. For example, U.S. Pat. No. 6,220,137 for a Router Template Assembly and U.S. Patent Application Publication No. 2003/0115767 for a Template for Remodeler Lighting Application each provide a template or guide to be positioned on a mounting surface to guide formation of an aperture, the former for the installation of a recessed junction box, and the latter for the installation of a recessed light fixture. U.S. Pat. No. 7,497,025 for a Universal Installation Template and Method of Use for Placement of In-Wall or In-Ceiling Speakers, on the other hand, describes an adjustable template to be mounted prior to drywall installation so to guide the formation of an aperture in receiving an in-wall or in-ceiling speaker.

This background information is provided to reveal information believed by the applicant to be of possible relevance. No admission is necessarily intended, nor should be construed, that any of the preceding information constitutes prior art.

SUMMARY

Some aspects of this disclosure provide a method and apparatus for outlining recessed installation of a component within a surface material that overcome some of the drawbacks of known techniques, or at least, provides the public with a useful alternative.

In accordance with one aspect of the disclosure, there is provided a template for outlining disposition of a recessed component within a surface material, comprising: two or more template modules adjacently disposable against the surface material and each comprising opposed edges that can be aligned with adjacently disposed edges so to define a substantially continuous spacing along said adjacently disposed edges, said spacing dimensioned so to accommodate a corresponding component dimension; wherein said aligned edges guide removal of surface material along said spacing to accommodate recessed installation of the component within the surface material.

In accordance with another aspect of the invention, there is provided an assembly for outlining recessed installation of a luminaire within a surface material, comprising at least two alignment modules adjacently mountable against the surface material and each comprising opposed edges that can be aligned with adjacently disposed edges so to define a substantially continuous spacing along said adjacently disposed edges, said spacing dimensioned so to accommodate a width of the luminaire and thereby guide removal of the surface material within said spacing to outline recessed lengthwise installation of the luminaire therein.

In accordance with another aspect of the invention, there is provided a method for installing an assembly of luminaire modules recessed within a surface material in accordance with a designated assembly pattern, the method comprising: mounting end-to-end, for each of said luminaire modules, a corresponding template module comprising opposed inner edges spaced relative to one another so to at least accommodate a width of its corresponding luminaire module, wherein said inner edges of adjacently disposed template modules are aligned to define a substantially continuous spacing outlining the designated assembly pattern; laying the surface material over said mounted template modules; removing surface material within said spacing guided by said inner edges; and installing the assembly of luminaire modules within said spacing in accordance with the designated assembly pattern.

Other aims, objects, advantages, aspects and features of the disclosure will become more apparent upon reading of the following non-restrictive description of specific embodiments, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 1 is a perspective view of different assemblies used in outlining recessed installation of respective components within a surface material, in accordance with different embodiments;

FIG. 2 is a perspective view of a template module for outlining recessed installation of a component, or module thereof, within a surface material, in accordance with one embodiment;

FIG. 3 is a perspective view of an end-to-end alignment of adjacent template modules, such as the module of FIG. 2, in accordance with one embodiment;

FIGS. 4A to 4G are sequential perspective views of a method for outlining and installing a recessed closed-loop luminaire within a false ceiling surface material, in accordance with one embodiment.

DETAILED DESCRIPTION

Figure 4A:
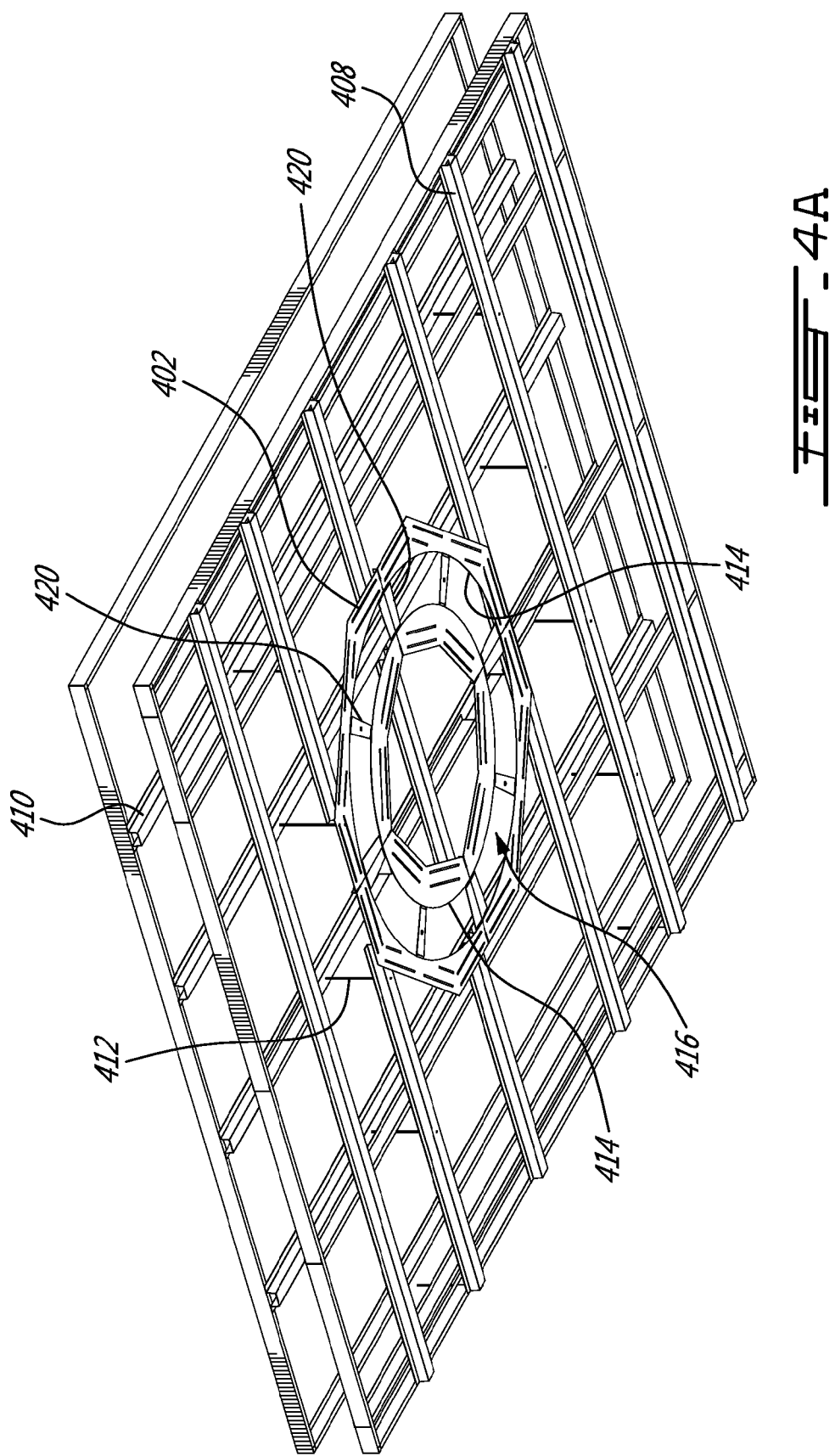

With reference to the disclosure herein and the appended figures, a method and apparatus for outlining recessed installation of a component within a surface material will now be described, in accordance with different embodiments.

With reference to FIG. 1, and in accordance with different embodiments, a series of template modules 100 are shown mounted and aligned in various configurations to outline a recessed installation of different components, such as luminaires, within a surface material (e.g. see surface material 450 of FIG. 4C to 4G). For instance, different combinations of rectilinear modules 102 and/or curvilinear modules 104 are shown in the formation of different combined installation patterns, which may include in some examples, a closed-loop pattern such as circle formation 106.

In one embodiment, each template or alignment module 102, 104 is mounted to a surface support structure, in this example consisting of a false ceiling grid 108 suspended from a structural ceiling 110 via support rods 112 or the like, to which a surface material (see FIG. 4C for example) may be subsequently installed to provide a finished appearance. As will be described in greater detail with reference to FIGS. 4A to 4G, the inner edges 114 of the aligned modules 102, 104 define a substantially continuous spacing 116 that reflects a designated pattern of the component to be installed recessed within the surface material. These inner edges 114 may thus provide guidance in the subsequent removal of surface material from within this spacing 116 (e.g. see FIG. 4D) to define an aperture within the surface material consistent with the component to be installed recessed therein.

With reference to FIG. 2, a given module 200, in this example a curved module, generally comprises opposed longitudinal edges 202 distanced relative to one another so to define a lateral spacing 204 therebetween, generally selected to at least accommodate a width of the component to be installed. For instance, in the example described below, the module 200 is dimensioned to outline installation of a curved or arcuate luminaire module, wherein a width of the spacing 204 is selected to accommodate at least a width of the luminaire module.

In this example, the opposed edges 202 are defined by the opposed inner edges of laterally spaced planar members 206, 208, a planarity of which serving to facilitate installation of the module 200 against the surface material (not shown) in which a recessed installation aperture is to be defined. A series of linear fastening slots 210 are also provided through planar members 206, 208 to facilitate mounting of the module 200 to an appropriate support structure, such as false ceiling structure 108 of FIG. 1, or again to the surface material itself in some examples.

In this embodiment, one or more removable crosslinks or like structures 210 are also provided to define and maintain a set spacing between edges 202 during installation, which crosslinks 210 may then be removed to provide for unobstructed guided surface material removal along the inner edges 202.

With added reference to FIG. 3, each module 200 further comprises a pair of alignment structures 212, 214 respectively defined at each longitudinal extremity thereof, namely at each corner, for alignment and cooperative engagement with corresponding alignment structures 214', 212', respectively, of an adjacently disposed template module 200'. In this example, each alignment structure 212, 214 comprises a longitudinal alignment feature, such as vertical tab 216, for guiding end-to-end abutment of adjacent modules. Each alignment structure 212, 214 further comprises a lateral alignment feature, in this example extending from vertical tab 216 and defined by a bent horizontal foot 218 split from a vertical tab extension 220 so to cooperatively engage, in the context of alignment structure 212, a lateral edge 222' of an adjacently disposed alignment structure 214', and in the context of alignment structure 214, so to allow for cooperative engagement of an adjacent horizontal foot 218' of and adjacently disposed alignment structure 212' against lateral edge 222. Accordingly, respective inner edges 202, 202' may be effectively aligned in forming a substantially continuous spacing 204, particularly upon subsequent removal of crosslinks 210.

It will be appreciated that different alignment features and/or structures may be provided in the context of the above-described and similar template modules to improve lateral and/or longitudinal alignment between adjacently disposed modules. For instance, different markings and/or structures may be provided toward or along the module extremities to be aligned in providing similar results, and that, without departing from the general scope and nature of the present disclosure.

With reference now to FIGS. 4A to 4G, an exemplary recessed ceiling luminaire installation will now be described, in accordance with one embodiment of the invention. In this example, an assembly of template or alignment modules 402, for example as described above with reference to FIG. 2, are provided for outlining recessed installation of a circular closed-loop luminaire (e.g. see installed luminaire 400 of FIG. 4G).

As best seen in FIG. 4A, the modules 402 are first adjacently mountable end-to-end to a surface support structure, in this example consisting of a false ceiling grid 408 suspended from a structural ceiling 410 via support rods 412 or the like. To accommodate the downstream recessed installation of the luminaire, elements of the false ceiling grid 408 that would otherwise interfere with the recessed installation are removed, and/or omitted.

Alignment structures, such as those described above with reference to FIGS. 2 and 3, may facilitate and/or improve alignment of the various modules 402 so to provide greater adherence to a designated luminaire outline pattern, or again to ensure or promote adherence to a prescribed mounting aperture tolerance, namely to reduce gaps that may ultimately result between the installed luminaire and surrounding surface material. As seen in FIG. 4A, the assembly of four (4) arcuate modules 402 results in the formation of a ring-like pattern having, in this particular example, a 3 foot diameter.

Figure 4B:
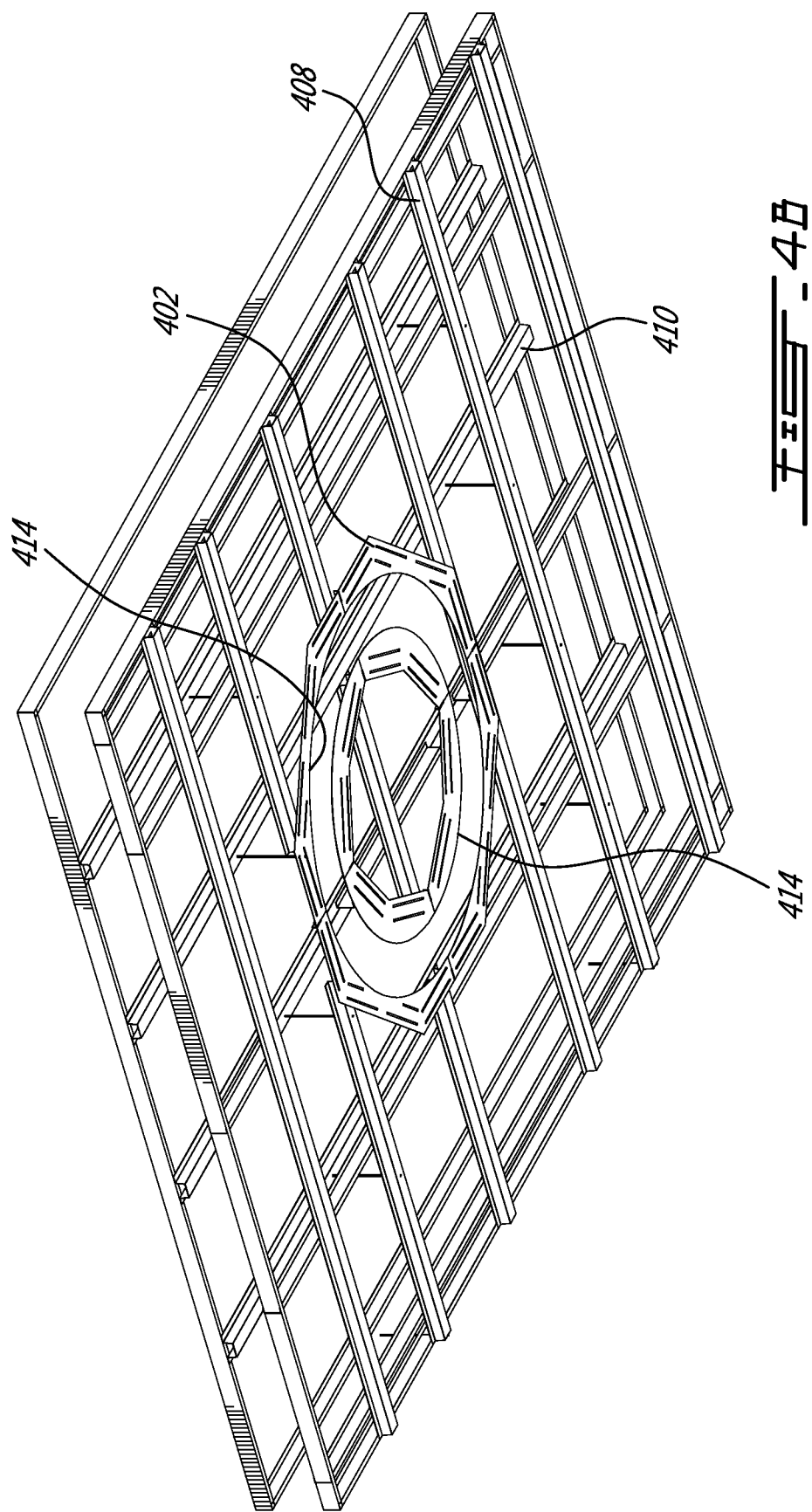

With reference to FIGS. 4A and 4B, once the modules 402 are adequately aligned and mounted, the inner edges 414 thereof define, in combination, a substantially continuous spacing 416 that reflects the designated pattern of the luminaire to be installed. The crosslinks 420 may then be removed (e.g. snipped, cut and/or broken off) such that inner edges 414 may provide a substantially unobstructed guide (e.g. see FIG. 4B) for the subsequent removal of surface material within the continuous spacing 416 so defined.

Figure 4C:
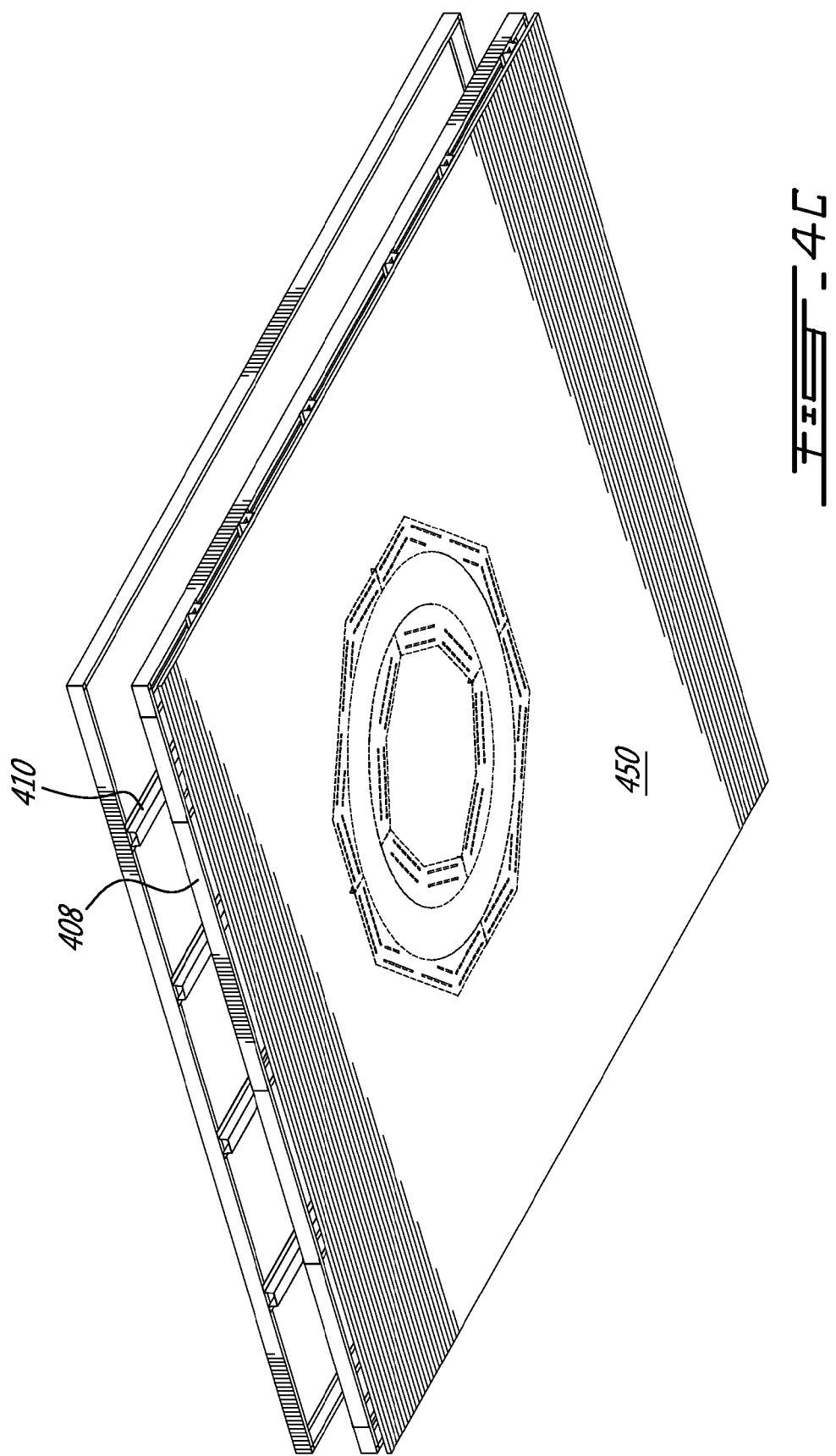
Figure 4D:
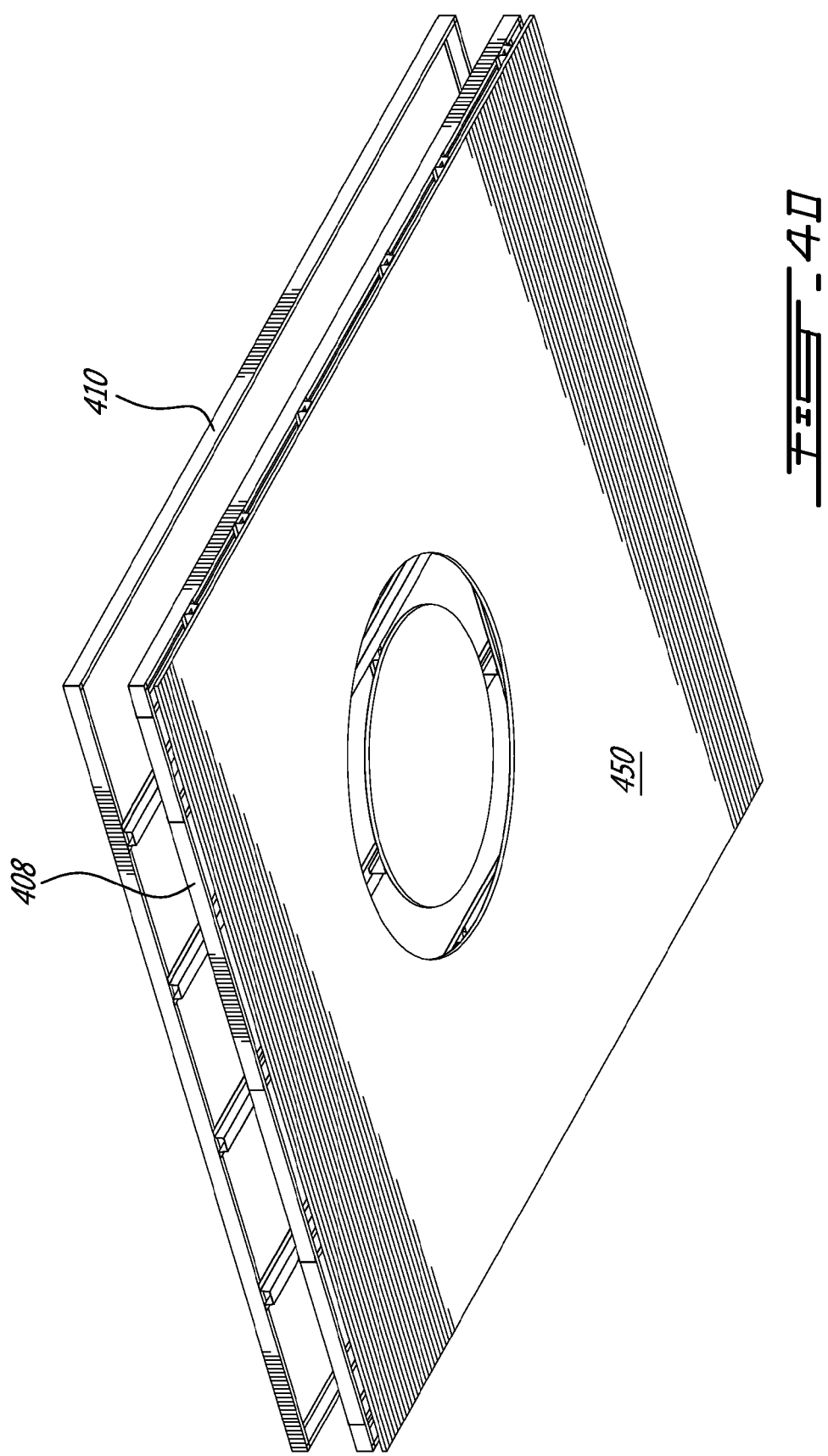

As shown in FIG. 4C, a selected surface material 450 may then be installed over and against the mounted modules 402, keeping track of a general location of the previously installed modules 402 (shown in phantom lines) for subsequent steps. Using an appropriate tool, such as a saw, knife, router or other such rotary tool, or other tool appropriate for the surface material at hand, the aligned inner edges 414 may be used as a guide in removing surface material from the spacing 416, resulting in a surface aperture consistent with the designated luminaire pattern (e.g. see ring-shaped aperture of FIG. 4D).

Figure 4E:
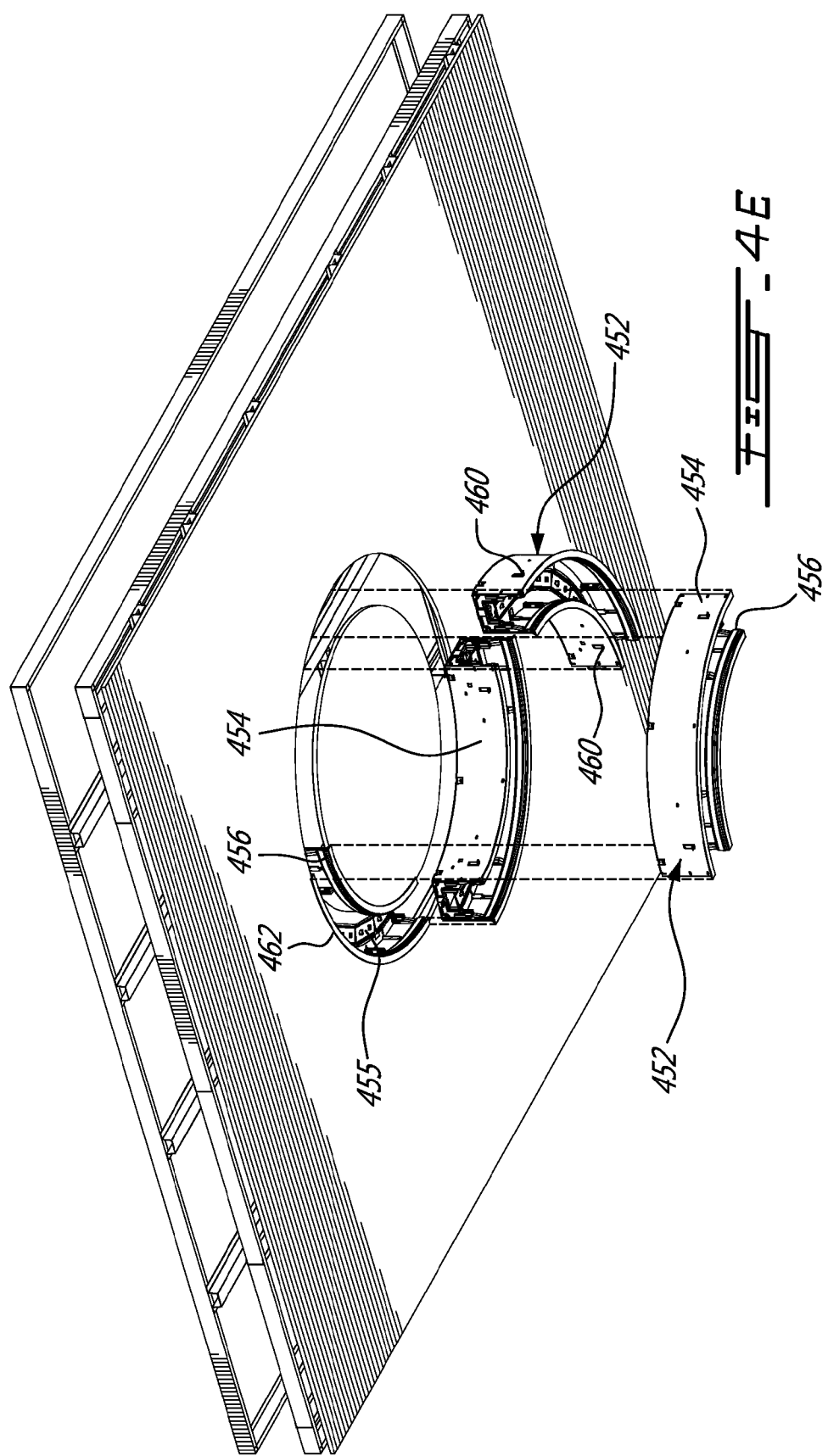
Figure 4F:
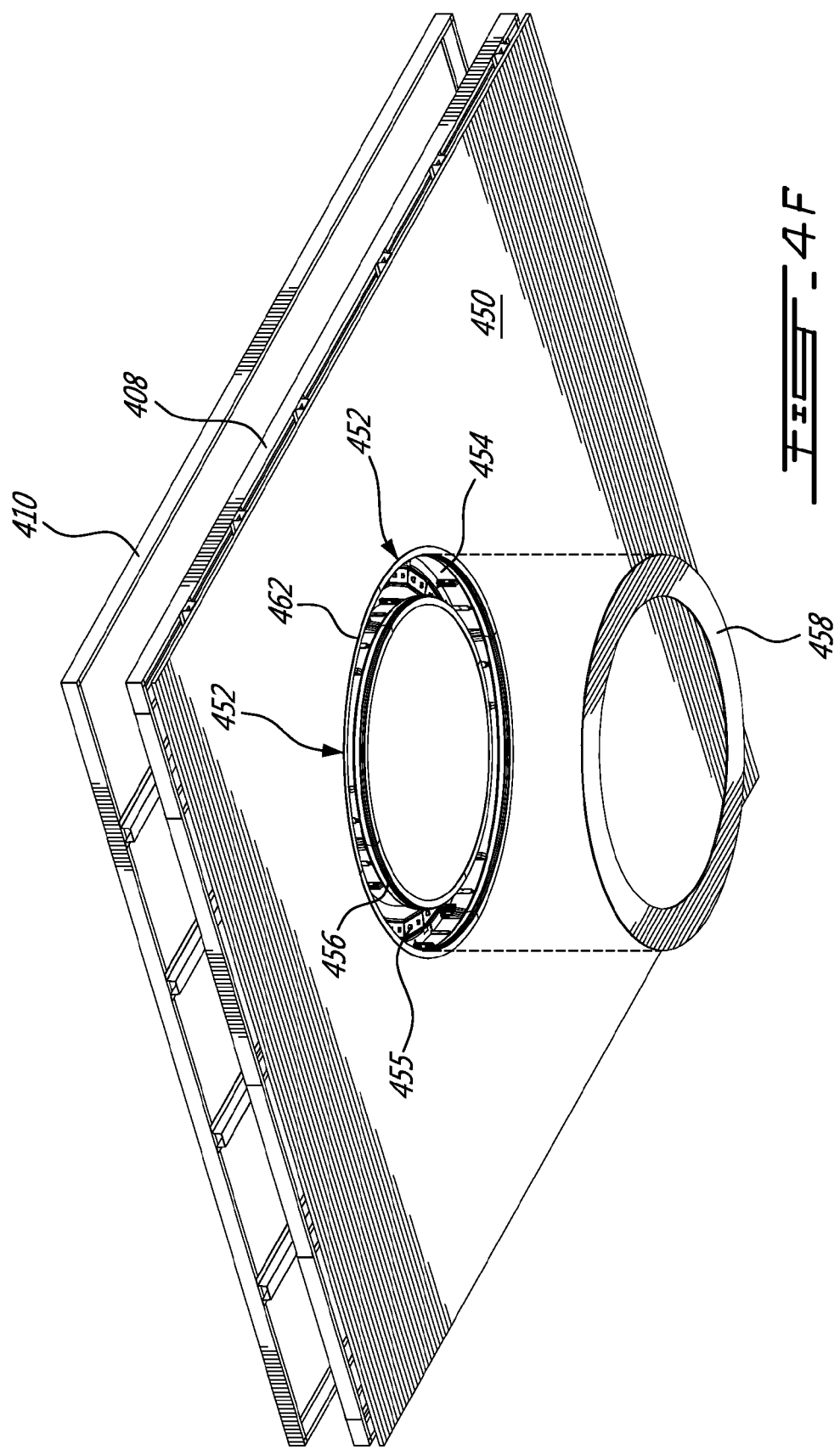

With reference to FIGS. 4E to 4G, and in accordance with one embodiment, the luminaire 400 comprises an assembly of four (4) curvilinear luminaire modules 452, each one of which comprising an arcuate housing 454 (e.g. housing various lighting components such as LED boards 455, and associated driving means) to be assembled end-to-end in forming the designated pattern. For instance, each housing 454 may be installed in sequence, for example via appropriate fastening means (e.g. bolts, screws, cables and the like—not shown) rigidly coupling a base of the housing to the structural ceiling 410, and interconnected to each subsequent housing via appropriate end-to-end coupling means (e.g. such as end brackets, clamps and the like—not shown), for example. Alternatively, each housing 454 may be preassembled in the designated configuration and installed as an assembled unit. These and other such considerations will be readily appreciated by the skilled artisan, and are therefore intended to fall within the general scope and nature of the present disclosure.

In this embodiment, each housing 454 is further provided with an adjustment bracket 460 which, upon adjustment, displaces its outwardly projecting foot to press against the edge of its corresponding template module (i.e. on the hidden side of the surface material 450) and thus squeeze the juxtaposed edges of the surface material and template module at the aperture between the foot of the adjustment bracket 460 and an outer flange 462 of the luminaire module 452. Accordingly, the template module may not only act as an alignment tool and guide for the outlining of the luminaire installation, but also provide reinforcement at the edge of the surface material aperture in securing a flush installation of the luminaire's outer flange 462, ultimately promoting a more refined finish.

Each module 452 further comprises an output lens coupling mechanism 456 along its periphery for the subsequent installation of an output lens, in this example consisting of a seamless ring-shaped flat lens 458 that snaps into place along its inner and outer edges. In one example, the output lens coupling mechanism 456 consists of opposed resiliently biased coupling flanges shaped and configured to expand upon the lens being pushed against it, and spring back into position to hook and thus retain the edges of the lens 458 in position. Other coupling mechanisms may also be considered, as can other lens or output component configurations (e.g. partitioned lens, filter, mask, diffuser, etc.), as will be readily appreciated by the skilled artisan.

As seen from this example, the assembly of template modules may include a corresponding alignment module 402 for each of the luminaire modules 452, thereby allowing for outlining of the combined pattern prior to installation of the luminaire 450. Using this approach, and considering different combinations of template module shapes, sizes and/or configurations (e.g. rectilinear modules and/or curved modules, possibly of different turning radii), different examples of luminaire patterns may include, but are not limited to, closed loop patterns such as circles, ovals and the like; linear patterns such as square or rectangular boxes, X-shaped patterns, etc.; curvilinear patterns such as sinusoids, curls, spirals, squiggle lines and the like; and various combinations thereof, to name a few.

In the illustrated embodiment of FIGS. 4A to 4G, each module is mountable to a surface support structure prior to installation of the surface material. In a similar embodiment, the modules may rather be mounted directly to the surface material, for example via appropriate fasteners and/or adhesives, to be removed thereafter (or left there as an aesthetic complement to the luminaire).

As will be appreciated by the skilled artisan, template or alignment modules such as those described above may be manufactured of different materials, which may include, but are not limited to, rigid plastics, polymers or other such composites, or again of different sheet metals such as steel or aluminum, to name a few. Modules may be stamped or otherwise formed depending on the material selection, and cut or punched to size and/or to exhibit the various features described above. Furthermore, while the above contemplates the provision of substantially flat modules, other shapes and sizes may be readily applied depending on the intended application. For example, where the apparatus is to be installed between a surface material support structure and the surface material itself, then it may be advantageous to have the templates formed of a substantially flat material. On the other hand, where the modules are to be aligned and installed above the surface material, while the provision of a flat contact surface may be desirable, the general thickness profile of the modules may take different forms, for instance in facilitating manipulation in manual installation, for example. These and other such considerations will be readily apparent to the person of ordinary skill in the art, and are therefore intended to fall within the general scope and nature of the present disclosure.

Furthermore, while the above illustrates a recessed ceiling installation, similar installations may also be considered in a wall or floor surface, or again along other surface geometries, such as in-room partitions, furniture, exterior accent or ambient lighting structures, interior lighting accent architectures and the like. Accordingly, while terms such as up/down, vertical, horizontal and the like apply in the selected orientation of the illustrated embodiments, it will be appreciated that reorientation of these embodiments and their equivalents may entail a corresponding realignment of general descriptive directional terms used herein, without departing from the intended scope of the present disclosure. Namely, directional terms are used herein solely for the purpose of illustrating one particular embodiment, and should not be construed as limiting within the general context of this disclosure as a whole.

The apparatus and method described herein may also be applicable for the outlining and recessed installation of a component within different surface materials. Examples of materials may include, but are not limited to, drywall, plasterboard, gypsum board and/or other such materials, as can other materials apply such as plywood, particle board, sheet metal and/or plastics, and the like, to name a few. Namely, while the selection of tools for the subsequent guided removal of material from the continuous gap defined by the aligned modules may vary depending on the material at hand, as can the selection of material for the modules itself change depending on the strength/durability required thereof in guiding such tool selection, similar principles may nevertheless be applied in outlining a recessed installation within a variety of material surfaces, and that, all within the general context of the present disclosure.

Furthermore, while an exemplary embodiment contemplates the outlining of a recessed luminaire installation, other recessed component installations may also be considered, particularly in the context where a shape and size of the component is amenable to a modular assembly of linear (e.g. rectilinear and/or curvilinear) subcomponents, and/or again, outlined via an assembly of end-to-end and/or juxtaposed modules defining a unitary component profile. As it will be appreciated by the skilled artisan, while the above makes reference to generally linear, longitudinal or lengthwise components, modules, and assembled patterns, this linearity will be understood to encompass different patterns generally defined by the alignment of end-to-end and/or juxtaposed components having a combined outline generally describable by a series of assembled linear (rectilinear and/or curvilinear) segments, as well as combinations of such linear outlines, which may not only include free-ended patterns, but also include closed-loop patterns and/or patterns exhibiting one or more linear crossings (e.g. X-shaped components) and the like.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A template for outlining disposition of a recessed component within a surface material, comprising:
   two or more template modules adjacently disposable against the surface material and each comprising opposed edges that can be aligned with adjacently disposed edges so to define a substantially continuous spacing along said adjacently disposed edges, said spacing dimensioned so to accommodate a corresponding component dimension;
   wherein said aligned edges guide removal of surface material along said spacing to accommodate recessed installation of the component within the surface material, wherein each of said template modules comprises opposed laterally spaced members and wherein said opposed edges are defined by respective opposed inner edges of said laterally spaced members.

2. The template of claim 1, wherein said template modules are mountable to a surface material support structure prior to surface material installation so to allow surface material installation over said aligned edges for subsequent guided removal of the surface material within said spacing.

3. The template of claim 1, wherein said laterally spaced members comprise substantially planar members disposable against the surface material.

4. The template of claim 1, wherein said laterally spaced members are distanced by one or more cross structures or links disposed between said inner edges so to define said substantially continuous spacing.

5. The template of claim 4, wherein said one or more cross structures or links are removable upon installation of said modules so to enable unobstructed guided removal of the surface material within said spacing along said aligned edges.

6. The template of claim 1, wherein each of said template modules comprises at least one alignment feature defined at a longitudinal extremity thereof for alignment with a corresponding alignment feature of an adjacently disposed template module.

7. The template of claim 6, wherein said alignment feature comprises an alignment structure extending from said extremity to engage a corresponding alignment structure of said adjacently disposed template module.

8. The template of claim 7, wherein said alignment structure comprises a longitudinal component and a lateral component disposed so to respectively engage a corresponding longitudinal component and lateral component of said corresponding alignment structure, thereby promoting longitudinal and lateral alignment of said adjacently disposed edges.

9. The template of claim 1, the component comprising a luminaire to be recessed within the surface material along said spacing.

10. The template of claim 1, the component comprising a curvilinear component, said two or more template modules comprising at least one curved template defining curved opposed edges in defining a curvilinear spacing therebetween.

11. A template for outlining disposition of a recessed component within a surface material, comprising:
two or more template modules adjacently disposable against the surface material and each comprising opposed edges that can be aligned with adjacently disposed edges so to define a substantially continuous spacing along said adjacently disposed edges, said spacing dimensioned so to accommodate a corresponding component dimension;
wherein said aligned edges guide removal of surface material along said spacing to accommodate recessed installation of the component within the surface material,
wherein said template modules are mountable to a surface material support structure prior to surface material installation so to allow surface material installation over said aligned edges for subsequent guided removal of the surface material within said spacing, and
wherein each template module comprises opposed laterally spaced and substantially planar members disposable between the surface material and the support structure, wherein said opposed edges are defined by respective opposed inner edges of said laterally spaced members, and wherein said substantially planar members provide reinforcement to the surface material along said spacing in securing, at least in part, subsequent installation of the component.

12. An assembly for outlining recessed installation of a luminaire within a surface material, comprising
at least two alignment modules adjacently mountable against the surface material and each comprising opposed edges that can be aligned with adjacently disposed edges so to define a substantially continuous spacing along said adjacently disposed edges, said spacing dimensioned so to accommodate a width of the luminaire and thereby guide removal of the surface material within said spacing to outline recessed lengthwise installation of the luminaire therein, wherein the luminaire consists, at least in part, of a curvilinear luminaire, wherein at least one of said alignment modules comprises curved edges so to define a curvilinear spacing therebetween and thereby accommodate the curvilinear luminaire.

13. The assembly of claim 12, wherein the surface material is mountable to a support structure, and wherein each of said alignment modules are mountable to the support structure prior to installation of the surface material thereabove so to guide subsequent removal of surface material along said spacing.

14. An assembly for outlining recessed installation of a luminaire within a surface material, comprising
at least two alignment modules adjacently mountable against the surface material and each comprising opposed edges that can be aligned with adjacently disposed edges so to define a substantially continuous spacing along said adjacently disposed edges, said spacing dimensioned so to accommodate a width of the luminaire and thereby guide removal of the surface material within said spacing to outline recessed lengthwise installation of the luminaire therein, wherein the luminaire consists of an assembly of rectilinear luminaire modules, curvilinear luminaire modules or curvilinear and rectilinear luminaire modules to be assembled in forming a combined pattern, the assembly including a corresponding alignment module for each of the luminaire modules, thereby allowing for outlining of the combined pattern prior to installation of the luminaire.

15. The assembly of claim 14, wherein the pattern comprises a closed loop pattern.

16. An assembly for outlining recessed installation of a luminaire within a surface material, comprising
at least two alignment modules adjacently mountable against the surface material and each comprising opposed edges that can be aligned with adjacently disposed edges so to define a substantially continuous spacing along said adjacently disposed edges, said spacing dimensioned so to accommodate a width of the luminaire and thereby guide removal of the surface material within said spacing to outline recessed lengthwise installation of the luminaire therein,
wherein the surface material is mountable to a support structure, and wherein each of said alignment modules are mountable to the support structure prior to installation of the surface material thereabove so to guide subsequent removal of surface material along said spacing, and
wherein each of said alignment modules comprises opposed planar members disposable against the surface material, wherein said opposed edges are defined by respective opposed inner edges of said planar members laterally distanced from one another by one or more crosslinks so to define said substantially continuous spacing, and wherein said one or more crosslinks are removable once said alignment modules are mounted so to enable unobstructed guided removal of the surface material within said spacing along said inner edges.

17. The assembly of claim 16, wherein each of said alignment modules comprises one or more alignment structures defined at each end thereof for cooperative engagement with corresponding alignment structures of adjacently disposed modules to promote lengthwise and lateral alignment of said adjacently disposed edges.

18. A method for installing an assembly of luminaire modules recessed within a surface material in accordance with a designated assembly pattern, the method comprising:
    mounting, for each of said luminaire modules, a corresponding template module comprising opposed inner edges spaced relative to one another so to at least accommodate a width of its corresponding luminaire module, wherein said inner edges of adjacently disposed template modules are aligned to define a substantially continuous spacing outlining the designated assembly pattern;
    laying the surface material over said mounted template modules;
    removing surface material within said spacing guided by said inner edges; and
    installing the assembly of luminaire modules within said spacing in accordance with the designated assembly pattern, wherein said inner edges are distanced by one or more cross members or links, the method further comprising, prior to laying the surface material, removing said one or more cross members or links so to subsequently enable unobstructed guided removal of the surface material within said spacing along said inner edges.

\* \* \* \* \*